Figure 1:
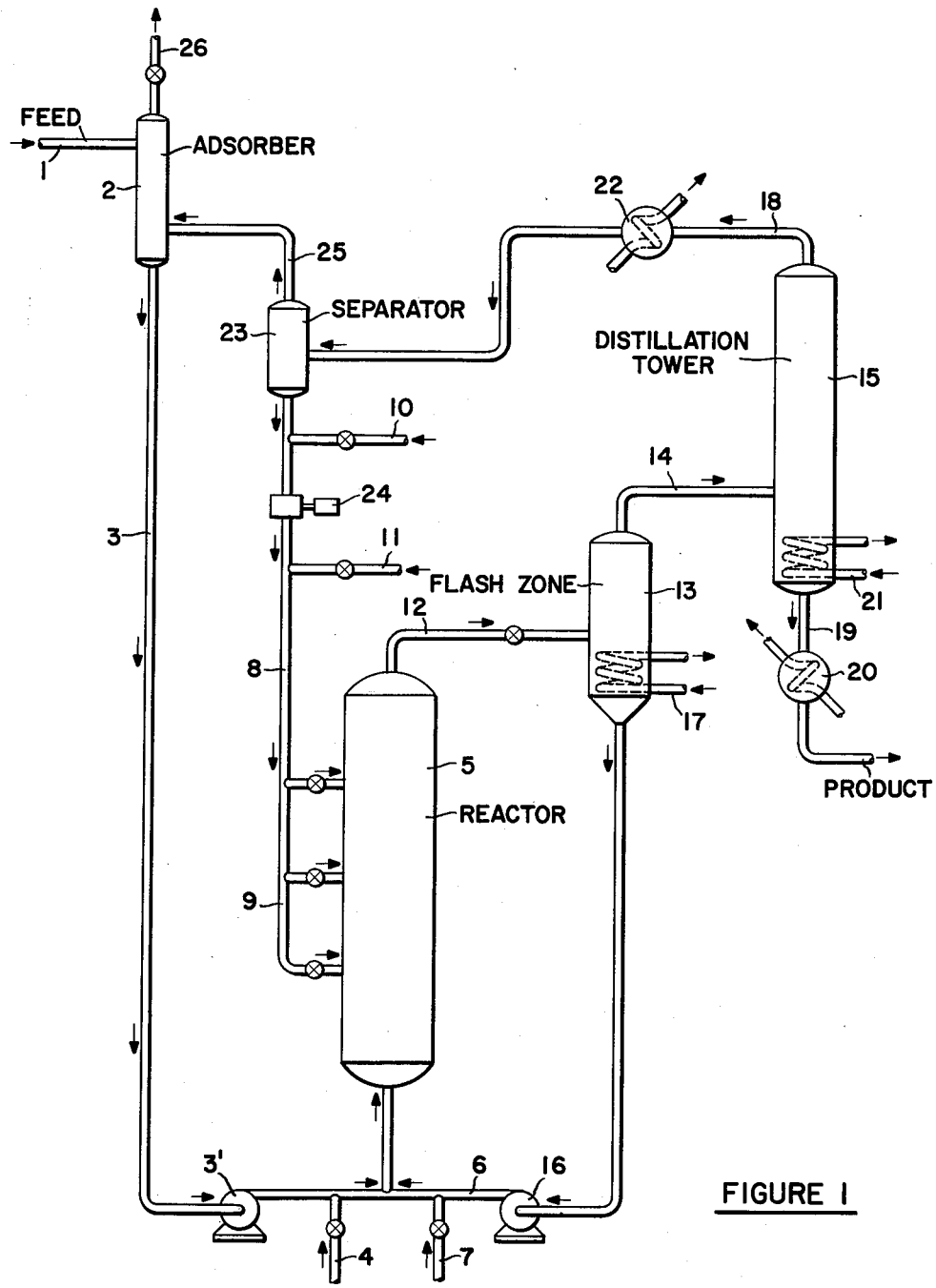

July 11, 1961  W. F. AREY, JR., ET AL  2,992,285
NAPHTHA ISOMERIZATION PROCESS
Filed July 16, 1959  2 Sheets-Sheet 1

William Floyd Arey, Jr.
Kenneth Earl Draeger  INVENTORS

BY *Richard W. Nagel*

PATENT ATTORNEY

July 11, 1961

W. F. AREY, JR., ET AL 2,992,285

NAPHTHA ISOMERIZATION PROCESS

Filed July 16, 1959

2 Sheets-Sheet 2

William Floyd Arey, Jr.
Kenneth Earl Draeger  INVENTORS

BY Richard N. Nagel

PATENT ATTORNEY

United States Patent Office 2,992,285
Patented July 11, 1961

2,992,285
NAPHTHA ISOMERIZATION PROCESS
William Floyd Arey, Jr., and Kenneth Earl Draeger, Baton Rouge, La., assignors to Esso Research and Engineering Company, a corporation of Delaware
Filed July 16, 1959, Ser. No. 827,638
7 Claims. (Cl. 260—683.75)

This invention concerns improvements in the catalytic isomerization of paraffin hydrocarbons. More particularly, the invention relates to improvements in the liquid phase conversion of normal or slightly branched chain hydrocarbons of from 5 to 6 carbon atoms to commercially valuable, more highly branched isomers, employing aluminum bromide as the catalyst.

It is well known that the more highly branched isomers of the paraffinic hydrocarbons occurring in petroleum gasoline fractions are more valuable than the corresponding slightly branched or straight chain hydrocarbons because of their higher octane ratings. The demand for motor fuels of greater octane number has increased markedly as the automotive industry has provided gasoline engines with increasingly higher compression ratios to attain greater efficiency. One of the economically important ways in which the increased demands for higher octane fuels can be met is through the isomerization of the light naphtha components of such fuels.

It may be generally stated that the isoparaffinic and branched chain paraffin hydrocarbons are of greater commercial value to the petroleum industry than the corresponding straight chain hydrocarbons. Thus, for example, 2,2-dimethyl butane has a higher octane rating than the isomeric normal hexane.

The isomerization of normal paraffin hydrocarbons of from 5 to 6 carbon atoms into the corresponding branched chain homologs is well known. For effecting the isomerization, it is customary to employ certain metal halides, particularly aluminum chloride or aluminum bromide, in conjunction with certain promoters, such as hydrogen chloride, hydrogen bromide or boron fluoride. Insofar as the isomerization of light naphthas is concerned, the lower the temperature of isomerization, within limits, the more favorable is the equilibrium for converting straight chain paraffin hydrocarbons into isomers of high octane rating. Aluminum bromide has been found to be more active than aluminum chloride at lower isomerization temperatures, e.g. in the range of about 50° to about 200° F. The isomerization catalyst employed may be AlBr$_3$ supported on suitable carriers such as Porocel, bauxite, alumina, molybdena, molybdena-alumina, silica gel or the like. Alternatively, co-catalysts consisting of complexes of aluminum bromide with ketones, alcohols, ethers, amines, inorganic acids, water or halogenated hydrocarbons may be used. The co-catalysts, which are normally liquid at reactor temperature and are largely insoluble in hydrocarbon, may be employed in stirred reactors or in "pool" reactors wherein the hydrocarbon feed is passed by gravity flow upward through a pool of co-catalyst. Both of these catalyst systems have been found to convert naphtha to near thermodynamic equilibrium distribution of isomers in once-through operation.

An important problem arising with the use of these highly active catalysts is that they promote side reactions, such as cracking and disproportionation. These side reactions are particularly evident at high conversion conditions. Extensive cracking and disproportionation must be avoided since they cause severe catalyst deactivation.

It has in the past been proposed to minimize cracking by adding to the hydrocarbon feed to be isomerized, certain naphthenic hydrocarbons, such as cyclohexane, methyl cyclopentanes, methyl cyclohexanes, and the like. These inhibitors, though helpful, are not completely successful in suppressing cracking to the low level necessary to maintain satisfactory catalyst life.

It has been found that cracking of hydrocarbons during isomerization may be substantially completely eliminated when, along with the naphthene, there is employed 5 to 500%, and preferably 25 to 100%, of isobutane in the isomerization zone.

It has also been found that cracking of hydrocarbons during isomerization may be substantially eliminated when, along with the naphthene, elemental hydrogen is employed by saturating the naphtha with hydrogen at 5 to 1000 p.s.i.g. pressure, preferably 50 to 500 p.s.i.g. pressure. In addition, excess hydrogen above its solubility may be employed at rates normally up to 100 mol percent, preferably from 0 to 25 mol percent.

It has been found that side reactions, such as cracking and disproportionation, are low at low conversion to high octane isomers. As conversion to high octane isomers increases the side reactions increase. With a C$_5$/C$_6$ virgin naphtha feed containing 10 to 20% naphthenes the cracking rate becomes competitive with the isomerization rate when the product contains about 92% isohexanes based on total paraffinic hexanes. Cracking of paraffins may produce a paraffin and an olefin. Olefins are known to cause catalyst deactivation by forming polymeric sludge containing aluminum halide. This not only causes undesirable consumption of aluminum halide but also results in excessive deactivation of the catalyst. It is postulated that the role of hydrogen and isobutane is that of converting the olefinic materials formed to saturates. Hydrogen pressure accomplishes this by hydrogenation of the olefin fragment. Isobutane may alkylate with olefins formed during cracking and thus effectively remove the olefins from the reaction mixtures.

As pointed out more clearly hereinafter, in a preferred operation the isobutane or hydrogen is recovered and recycled. Since butane, as well as the higher paraffins, is isomerized in this process, isobutane losses may be made up by adding n-butane to the system.

Desirable as it is to employ hydrogen or isobutane as a cracking and catalyst deactivation inhibitor, nonetheless the desirable effect of these inhibitors also entails a penalty in that either hydrogen or isobutane in the naphtha feed slows down the rate of isomerization.

The exact cause of this inhibiting effect is not known. It would appear that inhibition of the actual reaction mechanism is involved. In addition, the use of isobutane may also entail a dilution effect. In general, the amount of inhibition of the isomerization reaction is proportional to the amount of hydrogen or isobutane employed.

It is the principal object of the present invention to provide a means for effectively suppressing extensive cracking and disproportionation of hydrocarbons, during isomerization in a high conversion Friedel-Crafts isomerization process, so that the catalyst does not become deactivated and in a manner such that high isomerization rates are effectively maintained.

It is a still further object of the present invention to provide conditions for isomerization so as to obtain maximum yields of the most desirable isomers at maximum rates while minimizing degradation of the isomerization product and catalyst. Other and further objectives and advantages of the present invention will appear hereinafter.

In accordance with the present invention, a hydrocarbon feed comprising normal paraffin hydrocarbons predominantly of 5 and 6 carbon atoms is contacted with a catalyst comprised of aluminum bromide supported on a suitable carrier or an aluminum bromide complex catalyst in a suitable reactor in the presence of the naphthene and isobutane or hydrogen cracking suppressors and also in the presence of a hydrogen halide promoter at temperatures in the range of from 50° to 150° F. and under pressures of from about 5 to 500 p.s.i.g.

In further accordance with the present invention, the isobutane or hydrogen is injected into the reactor, not with the feed, but into the reactor section where conversion has approached the level where cracking becomes a problem. This conversion level may be about 70 to 85% isomers in the total acyclic material. By introduction of the hydrogen or isobutane in this manner the isomerization rate inhibiting effect is avoided until the cracking inhibition actually is required. At low converson substantially no cracking occurs even without the presence of isobutane or hydrogen. This makes for a far more efficient utilization of reactor capacity.

The isobutane or hydrogen may be injected into the reactor system by one or more injection points located along the length of the reactor to allow the inhibitor to be introduced in the desired zones, i.e. those wherein conversion is at least 70%. These zones will vary in location depending upon the catalyst activity, type and nature of feed stock and the like.

The features of this invention will be more fully appreciated when reference is made to the accompanying drawings which illustrate schematically suitable arrangements of apparatus for conducting the process.

Referring to FIGURE 1 for the isobutane inhibitor case, a $C_5/C_6$ hydrocarbon feed is passed through line 1 to the adsorber 2 where the feed absorbs HBr recycled through line 25. The HBr-hydrocarbon mixture from the bottom of the adsorber is removed via line 3 by pump 3' to the bottom of the reactor 5. Recycle $AlBr_3$ is added to the reactor through line 6. Makeup $AlBr_3$ and HBr to give the desired concentrations are added through lines 4 and 7. Sufficient pressure is maintained to keep the HBr dissolved in the hydrocarbon phase. The reaction zone, either a single vessel or several smaller vessels in series, may contain a bed of suitable support material for the aluminum bromide, such as alumina, silica, bauxite or the like, or it may contain a liquid catalyst consisting of a complex of aluminum bromide with an alcohol, ketone, amine, water, inorganic acids, halogenated hydrocarbons, or hydrocarbons. With the liquid aluminum halide complex catalyst some method such as an agitator must be provided for intimately contacting the liquid catalyst with the hydrocarbon feed. When employing a solid support such as alumina or bauxite for the aluminum bromide, the support will adsorb 10 to 80% aluminum bromide based on support weight. The supported aluminum bromide catalyst is formed by introducing aluminum bromide at 1 to 30 wt. percent concentration in the initial portion of the feed. The aluminum bromide complex catalyst may be formed externally and added to the reaction zone or it may be formed by adding the aluminum bromide at 1 to 30 wt. percent concentration in the initial portion of the feed. After formation of the supported or complexed aluminum bromide catalyst, the amount of aluminum bromide added in the feed may then be reduced to the quantity of $AlBr_3$ desired in the process.

In accordance with the present invention, isobutane is added to the feed in reactor 5 by recovering the isobutane from the product and recycling it through line 8 and manifold 9 to enter the reaction zone at the desired point or points. Isobutane may be added through line 10 to make up for small isobutane losses in the process. If desired, n-butane may be added to make up for isobutane losses since normal butane is readily isomerized to an equilibrium mixture of isobutane-normal butane in reaction zone 5. The naphthenes may be introduced with the feed or separately through line 11. It is desired to maintain in reaction zone 5 from 2 to 50 volume percent, based on feed to be isomerized, of naphthenes and from 25 to 100 volume percent of isobutane. As pointed out, the injection points are spaced along the reactor so that isobutane is only added to that portion of the system where high conversion of hydrocarbon has occurred.

The feed is conducted through the reaction zone at rates of the order of 0.05 to 5 v./v./hr. As previously stated, reaction temperatures of from about 50° to 150° F. are employed in reaction zone 5. Preferably, the reaction temperature is in the range of from about 80° to 120° F. for maximum production of highly branched isomers.

The reaction products together with a small amount of dissolved aluminum bromide leave the reaction zone through line 12 and pass to flash zone 13. 50 to 95% of the product is flashed overhead in the flash zone 13 and flows through line 14 into the distillation tower 15. The bottoms from the flash tower 13 are pumped through pump 16 back to the reactor inlet. Heat is added to the flash zone 13 through line 17. If it is desired to recycle essentially pure naphthenes with the $AlBr_3$, flash zone 13 may be replaced by a distillation tower to concentrate naphthenes in the tower bottoms for recycle along with the $AlBr_3$ to the reaction zone.

The overhead from the flash zone 13 is fractionated in distillation tower 15 to remove the HBr and the isobutane and lighter hydrocarbons through line 18. The $C_5/C_6$ hydrocarbons are withdrawn from the bottom of the distillation tower through line 19 and cooler 20 to tankage. Heat is added to the distillation tower through line 21.

The overhead from the distillation tower 15 is passed through cooler 22 and separated in separator 23 into liquid isobutane and gaseous HBr and light hydrocarbons. If desired, fractionation could be incorporated in separator 23 to give better separation of isobutane and HBr. The isobutane plus makeup butanes from line 10 are pumped through pump 24 back to desired injection point or points in the reactor.

The gaseous HBr and light hydrocarbons are removed from the separator 23 through line 25 to the adsorber 2 where the HBr is adsorbed in the feed. Any unadsorbed materials are removed from the adsorber 2 through line 26. Any desired pressure up to the system pressure can be maintained on the adsorber.

Figure 2:
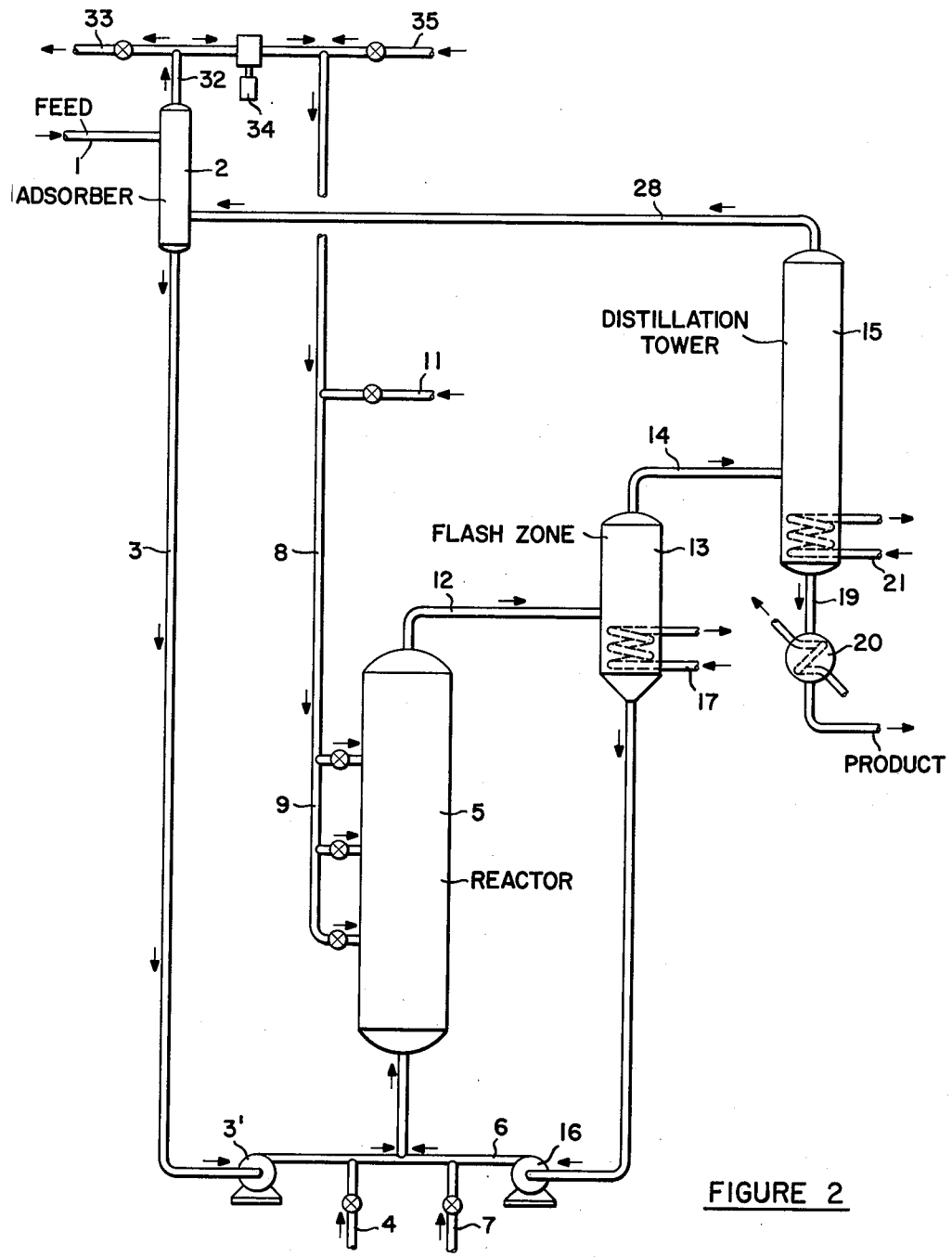

The flow scheme for the hydrogen inhibitor case is the same as for the isobutane case except in the distillation tower 15 overhead and adsorber 2 sections. The flow scheme for this hydrogen case is shown in FIGURE 2, wherein equipment and flow lines identical with FIGURE 1 are given the same numbers as in that figure. The overhead from the distillation tower 15 passes to the absorber 2 through line 28 where the HBr is adsorbed. The hydrogen and light hydrocarbons not adsorbed are removed as a gas from the top of adsorber 2 through line 32. Gas is purged through line 33 to maintain the desired hydrogen purity. The recycle hydrogen is compressed in 34 to reaction pressure and passes into manifold 9 for injection at the desired point or points in the reactor. Makeup hydrogen is added to the system as needed through line 35.

The following specific examples illustrate the benefits to be derived from the process of the present invention.

*Example 1*

A South Louisiana $C_5/C_6$ virgin naphtha containing 18% naphthenes was isomerized with added isobutane, with added hydrogen and also without either added isobutane or hydrogen. The isomerization was carried out in a flow system with a fixed bed reactor containing 400 cc. of catalyst consisting of aluminum bromide supported on 10 to 30 mesh LV Grade Porocel (Porocel is an acid washed, calcined bauxite). Aluminum bromide was added to the system by dissolving it in the feed at concentrations of 1 to 3 wt. percent on feed. Nine wt. percent hydrogen halide promoter, based on feed, was added to the feed prior to the feed entering the fixed bed of aluminum bromide Porocel catalyst. The reactor temperature was controlled at 100° F. and reactor pressure at 75 p.s.i.g. The following data were obtained.

| Naphtha Feed | Percent Naphthenes Based on Naphtha Feed | Percent Isobutane Based on Naphtha Feed | Hydrogen Partial Pressure p.s.i. | Conversion Level, Percent i-C$_6$ Based Paraffinic C$_6$ in Product | Catalyst Activity Maintenance |
|---|---|---|---|---|---|
| S. La. C$_5$/C$_6$ | 18 | 0 | 0 | 90-92 | Declined to 14% of initial activity after 32 hrs. operation. |
| S. La. C$_5$/C$_6$ | 18 | 50 | 0 | 90-92 | No decline in activity in 400 hrs. operation. |
| S. La. C$_5$/C$_6$ | 18 | 0 | 175 | 90-92 | Essentially no decline in activity. |

These data clearly show the beneficial effect of naphthenes plus isobutane or hydrogen on catalyst activity maintenance.

*Example 2*

Data on the inhibiting effect of isobutane and hydrogen on both cracking and isomerization rate are shown in this example. This comparison is for (Case I) the introduction of isobutane along with fresh feed to the reactor and (Case II) the introduction of isobutane into the reactor at the point where iso-C$_6$ content is 85% on total acyclic hexanes. Also compared are Case III for the introduction of hydrogen along with the fresh feed to the reactor and Case IV for the introduction of hydrogen into the reactor at the point where iso-C$_6$ content is 85% on total acyclic hexanes. Case II for isobutane addition and case IV for hydrogen addition are shown to allow a considerable increase in feed rate for the same ultimate conversion.

| | Case I | Case II |
|---|---|---|
| Support-Promoter | Porocel | Porocel. |
| AlBr$_3$, Wt. Percent on feed | 3 Wt. Percent | 3 Wt. Percent. |
| HBr, p.s.i.g. | 75 | 75. |
| Isobutane, Percent on Effluent | 75 | 75. |
| Place of Injection | With naphtha feed at reactor inlet. | Into reactor at 85% iso-C$_6$ content-Ca ¼ of way through reactor. |
| Iso-hexanes in Product, Percent of Acyclic C$_6$ | 93 | 93. |
| Hexane feed rate, v./v./hr | .12 | .25. |

| | Case III | Case IV |
|---|---|---|
| Support-Promoter | Porocel | Porocel. |
| AlBr$_3$, Wt. Percent on feed | 4 Wt. Percent | 4 Wt. Percent. |
| HBr, Wt. Percent on feed | 9 Wt. Percent | 9 Wt. Percent. |
| Hydrogen Partial Pressure, p.s.i. | 175 | 175. |
| Place of Hydrogen Injection | With naphtha feed at reactor inlet. | Into reactor at 85% iso-C$_6$ content-Ca 30% of way through reactor. |
| Feed Rate, v./v./hr | .10 | .19. |

Various mechanical means may be used for introducing the isobutane or hydrogen but those which would give good mixing of the added inhibitor with the feed would obviously be desired. As a corollary, the reactor section could consist of two separate reactors, the first running without isobutane or hydrogen to the desired conversion level with the isobutane or hydrogen added to the effluent and then run to the second reactor to complete the desired conversion. Also, extraneous HBr and/or AlBr$_3$ could be introduced with the added isobutane.

The process of the present invention may be modified in many ways without departing from its scope. Thus it may be desirable to pretreat the hydrocarbon feed to remove materials that might inactivate the catalyst or inhibit the reaction. It may be desirable to remove aromatics to a very low level, of the order of 0.02% or less, by a selective adsorption or hydrogenation process. Olefins also interfering with the isomerization reaction may be removed by these methods.

What is claimed is:

1. An improved process for isomerizing paraffin hydrocarbons having from 5 to 6 carbon atoms to the corresponding more highly branched isomers which comprises contacting said paraffin hydrocarbons, in admixture with from 10 to 20 volume percent of naphthenic hydrocarbons, in the liquid phase with a catalyst comprising aluminum bromide in a reaction zone maintained at a controlled temperature in the range of 50° to 150° F. and a pressure of from about 5 to 500 p.s.i.g., and in the presence of an added hydrogen halide promoter, conducting said hydrocarbons through the said reaction zone containing the said catalyst, and introducing into said reaction zone a cracking suppressor selected from the group consisting of hydrogen and isobutane, said cracking suppressor being introduced into said reaction zone solely at a point wherein at least 85 percent conversion of said paraffinic hydrocarbons to more highly branched isomers has occurred.

2. Process as defined by claim 1 wherein said reaction temperature is in the range of from about 80° to 120° F.

3. The process of claim 1 wherein said suppressor is isobutane and from 25 to 100% by weight of said isobutane, based on hydrocarbon feed, is introduced into said zone.

4. The process of claim 3 wherein said hydrocarbons passed to said reaction zone are substantially free of aromatic hydrocarbons.

5. The process of claim 1 wherein said suppressor is hydrogen and a pressure of 5 to 1000 p.s.i.g. H$_2$ is maintained in said reaction zone.

6. The process of claim 1 wherein at least a portion of said catalyst is carried on a support.

7. The process of claim 1 wherein at least a portion of said cracking suppressor is withdrawn from the reaction product and recycled to said process.

References Cited in the file of this patent

UNITED STATES PATENTS

| 2,355,198 | Atwell | Aug. 8, 1944 |
| 2,394,803 | Peery | Feb. 12, 1946 |
| 2,438,421 | Sensel et al. | Mar. 23, 1948 |